March 28, 1939. C. P. MERCAU 2,151,929
APPARATUS FOR REGISTERING, FILING, AND EXTRACTING CARDS, RECORDS, ETC
Filed Oct. 27, 1934 6 Sheets-Sheet 1

CARLOS PONCIANO MERCAU
INVENTOR
BY Haseltine, Lake & Co.
ATTORNEYS

March 28, 1939.　　　C. P. MERCAU　　　2,151,929
APPARATUS FOR REGISTERING, FILING, AND EXTRACTING CARDS, RECORDS, ETC
Filed Oct. 27, 1934　　　6 Sheets-Sheet 6

CARLOS PONCIANO MERCAU
INVENTOR
BY Haseltine, Lake & Co.
ATTORNEYS

Patented Mar. 28, 1939

2,151,929

UNITED STATES PATENT OFFICE 2,151,929

APPARATUS FOR REGISTERING, FILING, AND EXTRACTING CARDS, RECORDS, ETC.

Carlos Ponciano Mercau, Buenos Aires, Argentina

Application October 27, 1934, Serial No. 750,393
In Argentina October 31, 1933

4 Claims. (Cl. 129—16.1)

This invention refers to an automatic apparatus for registering, classifying and filing file-cards, memorandum-books, books, etc., to be used chiefly in offices or similar places where it is desired to have a perfect filing organization. The apparatus in question allows not only of registering and classifying cards, memorandum-books, books, etc., but also does it assist in finding them almost instantaneously, due to the ingenious arrangement of the elements of which it is composed. The machine is so constructed that, in the first place, for instance on an alphabetical keyboard and with the machine adjusted in a special way, a name (which might correspond with a determined individual) is registered, whereupon the machine is brought back to its normal position and we have the following effects: (1) each time the alphabetical keyboard is operated in the same sequence of letters as followed when the name was registered, a holder will appear before the machine, carrying the corresponding file-card; (2) two or more file-cards could be contained in the said holder, thus doubling or tripling the capacity of the apparatus; (3) although there may exist many equal names, it will be sufficient that one sole letter of either the Christian name or the surname be different to individually separate the file-card from those that were registered with almost the same letters; (4) the registering operation takes place only once for each new name or file-card to be filed in the apparatus, and when it is desired to have this card appear all that is necessary is to again frame the name on the keyboard in the same way as is done on a typewriter.

The machine is constructed on a principle of rigid contiguous and superposed plates or sheets which are caused to move on from distance to distance through the action of, for example, a keyboard by means of which the name is written, so that these plates will assume multiple positions in accordance with the number of names registered, one and the same relative position between the same plates corresponding with the same name. When the plates are perforated in each one of these positions at a determined point, and a stem could be made to pass through this perforation from behind, we would get this stem to push a determined file-card or group of file-cards which, to this effect, would be located exactly in front of it. This card or cards will be those corresponding with the name marked with the keys and as often as this name is marked on the keyboard the file-card or cards we are looking for will be obtained from among the series of file-cards contained in the apparatus.

In order to ensure the proper working of the apparatus it is provided with means for causing the pins or stems to act on the plates at the very moment of the name being marked for the removal of its file-card, as well as with means for readjusting the apparatus back to its normal position once the name has been operated or indicated or the file-card been removed, and with means for moving the plates, without varying the relative position between them, in the preliminary operation of registering a name, in order to place them at a point appropriate for punching them.

In order that the invention may be fully understood and readily put into practice it is by way of example shown in the accompanying drawings, wherein.

In the various figures of the drawings, the same visible or corresponding parts are indicated by the same reference numerals.

The structure of the apparatus comprises five important groups which, for the sake of better understanding, I have divided as follows:

(1) Card-carrier mechanism; (2) Mechanism for marking a name to which the file-card belongs; (3) Mechanism for registering a name into the plates of the apparatus by means of perforations punched into them as often as a new card is filed; (4) Mechanism for the selection and removal of a card the name of which had already been registered in the apparatus; (5) Normalizing mechanism, i. e., a device that restores the apparatus back to its initial position.

*Group 1.—Card-carrier mechanism*

Figure 2:
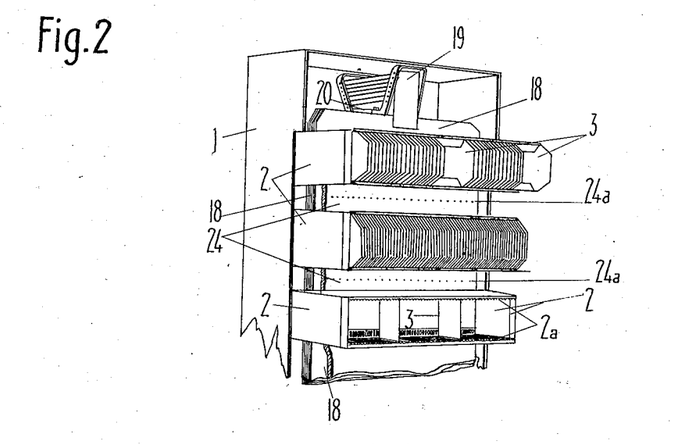
Figure 2 is a perspective view of the front part of the apparatus where the cards are located.

The apparatus which is shrouded in a casing 1 carries at its front a suitable amount of shelves 2 (Figs. 2 and 3) wherein a succession of holders 3 (Fig. 6) is mounted, the cards 4 being held or guided in these latter. The holders 3 protect the cards from frictions and blows they might be exposed to while being operated, as will be seen later on. Each one of these holders may contain one or various cards, dependent on the capacity it is desired to give to it. The shelves 2 are a type of boxes the inside of which is provided both at the top and the bottom with a plurality of flutes 2a (Fig. 2) wherein the holders 3 can slide and be kept in place. The insertion of the holders is accomplished from the front, viz, from the front of the shelves 2, a slight space being left between one and the other. Furthermore, the shelves 2, in turn, are also somewhat spaced apart one from another as regards their location on the front of the casing 1 and their position one above the other.

*2nd group.—Mechanism for marking a determined name or the name the file-card belongs to*

This mechanism is employed both for the registering of the new names corresponding with the file-cards that are being filed, and for finding a card, as often as it is desired, by means of the additional part which will be specified hereinafter under Group 3. The mechanism comprises, first of all, a series of keys 5, 5a and 5b (Figs. 3 and 7) disposed or arranged in three rows 1a on an extension of the casing 1, forwardly, similar to the keyboard of a typewriter. On their surface where the fingers depress them, they bear the letters of the alphabet. These keys are connected to their levers 6, 6a, and 6b provided with unequal and angular arms, in the vertexes of which the cross shaft 7 is mounted which they use as a bearing point and around which they turn for the fraction of an arc, the length also being unequal. This applies to every group of three keys each time, taking one of each row 1a, and which form a somewhat oblique row (see Fig. 7).

To the other end of each lever 6, 6a and 6b the rack engaging hooks or pullers 8 (being a type of hooked bars) are attached having teeth which are arranged on their free ends and mesh with the rack 10 equipped with oblique teeth. The action of the pullers 8, as often as a key 5, 5a and 5b . . . is depressed, consists in causing the said rack to be drawn a short distance along its longitudinal path of travel, as will be explained hereinafter, and to facilitate its forward movement when it is brought to its initial position the compression spring 11 is provided below (see also Figs. 4 and 5), trailed around the rod 12 connected at one end to the said rack 10 while with its other end it freely rests on its support 13.

To this end, a narrow cavity is provided underneath each rack 10, as at 14 and wherein the aforementioned elements are housed. On the other hand, the racks 10 abut against the cross bar 15 in their rearward movement doing so with their rearward ends at which end they receive the cables 16 which, after passing through fast or soldered guides 17, 17a and 17b (Figs. 3 and 7), turn upwardly in order to translate a horizontal movement into a vertical one. At its continuation each cable 16 receives a plate 18 which plates are superposed one above the other or near each other and pass just behind the shelves 2 of the file-cards 4 (Figs. 2 and 3) as described under "Group 1." These plates 18, the number of which will be equal to that of the racks 10 that may be employed in the apparatus, may be seen in detail also in the Figs. 8, 9, 10, 11 and 12 for the explanation of their operation which will be given hereinafter. Since seven plates are concerned in that example, these plates are indicated by their cardinal numbers in the Figures 8 and 9.

At their top or end portion the plates 18 are connected to ribbons or similar devices 19 (Figs. 1, 2 and 3) which, after passing over a series of rollers 20 link up with the tension springs 21 secured to the internal bottom of the apparatus. It is in this manner that the plates 18 are kept completely extended behind the shelves 2.

Figure 7:
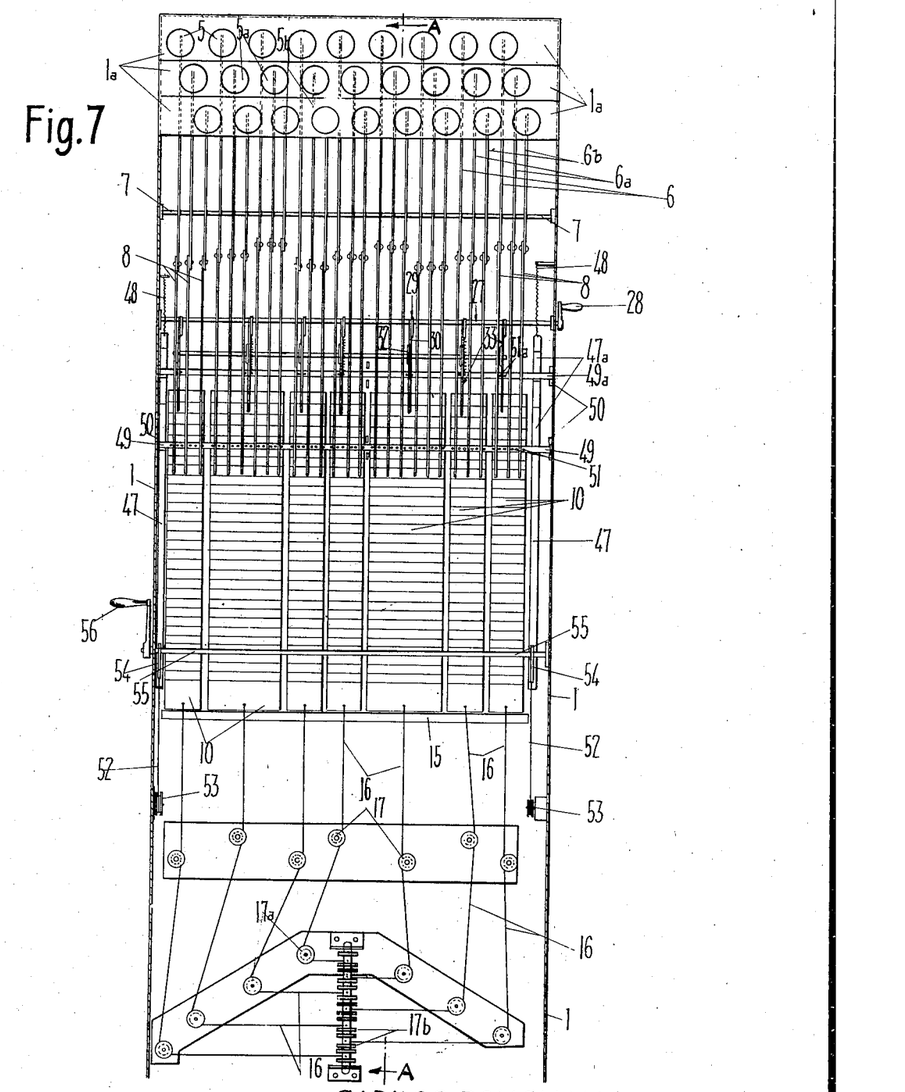
Figure 7 is a general plan view, on an enlarged scale, as seen from above in Figs. 1 and 3.

In Fig. 7 we see the possibility of combining in a group not only three pullers 8 but six (or any other number) on each rack 10, whereby the functions of the system will not be altered substantially,—as will be seen from what is going to be explained right hereafter.

When, with the view in mind of marking any name, the keys 5, 5a and 5b are operated in the same way as happens with a typewriter, the racks will travel back, for example, for one, two or three teeth, that is to say, just as many as numbers of operations are executed on the respective keys they belong to. Therefore, once the inscription is finished, the racks 10 and, consequently, their plates 18 will be in a position that leaves them spaced away from their original one, for the pullers 8 make them travel downwardly, due to the movement they receive from the levers 6, 6a and 6b. The racks 10 are, of course, kept in their resulting position, for the puller or the pullers 8 of a group acts as a pinion or pawl at the moment when the puller belonging to the key that is depressed brings about the said back-travel.

It should be noted that the potential energy of the springs 22 (Fig. 3) trailed around the stems of each key 5, 5a and 5b is higher than that of the springs 11 of the racks 10 and that of the springs 21 of the plates 18, in order to make sure that, upon freeing each key after its depression, the first named spring will overcome the other two springs 11 and 21.

Figure 12:
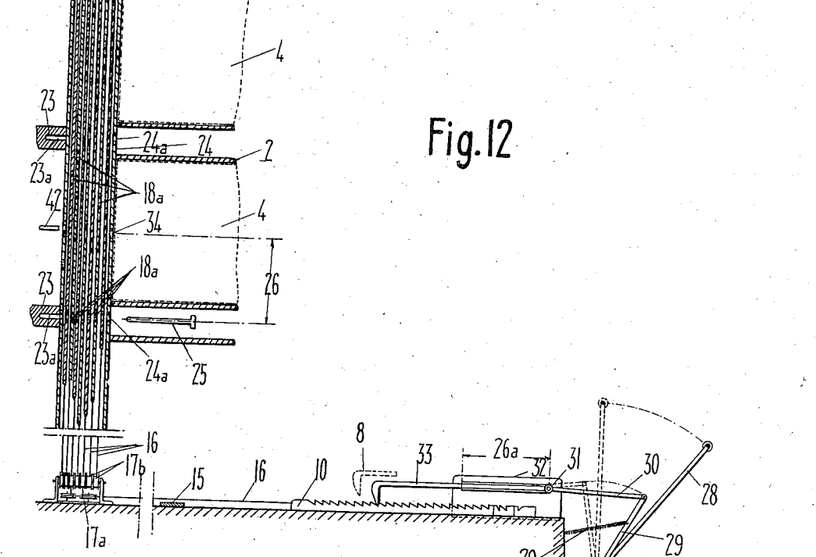
Figure 13:
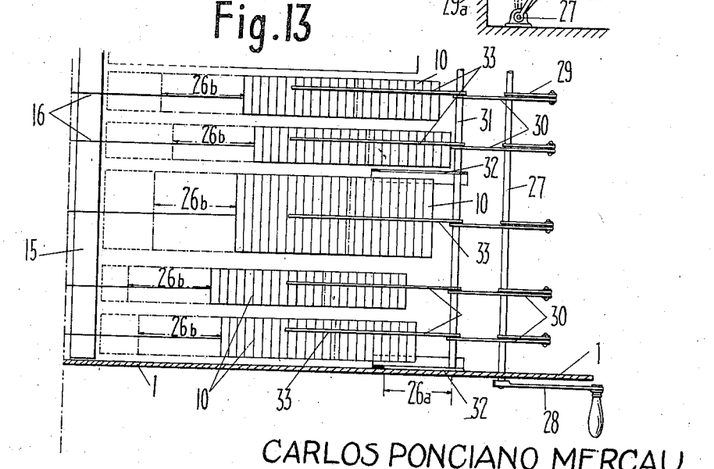
Figure 13 is a plan view of a portion of the mechanism illustrated in the foregoing figure.

Up to now we have seen how a name is marked on the apparatus and how the relative position is one which the plates 18 remain in as a consequence of their being connected, by means of the cables 16, to the racks 10. In Figs. 12 and 13, the solid lines and the dot and dash lines respectively indicate a determined position of the plates 18 and racks 10 as arrived at after the marking of a determined name, while in the Figs. 8 and 9 we see the initial position of the plates 18, all of this in accordance with what has been explained up to now. Hereinafter it will be seen how a name is registered as a preliminary act to a new card being filed for the first time, or, in other words, how the names are registered in accordance with their corresponding cards which are to be filed in the apparatus.

*3rd group.—Mechanism for registering a name in the apparatus*

This mechanism consists in nothing else but in producing the perforation of the plates 18, once the corresponding name has been written, the perforation being performed at the same point where the card with which the said name corresponds is located.

Figures 3, 4, 5, 6:
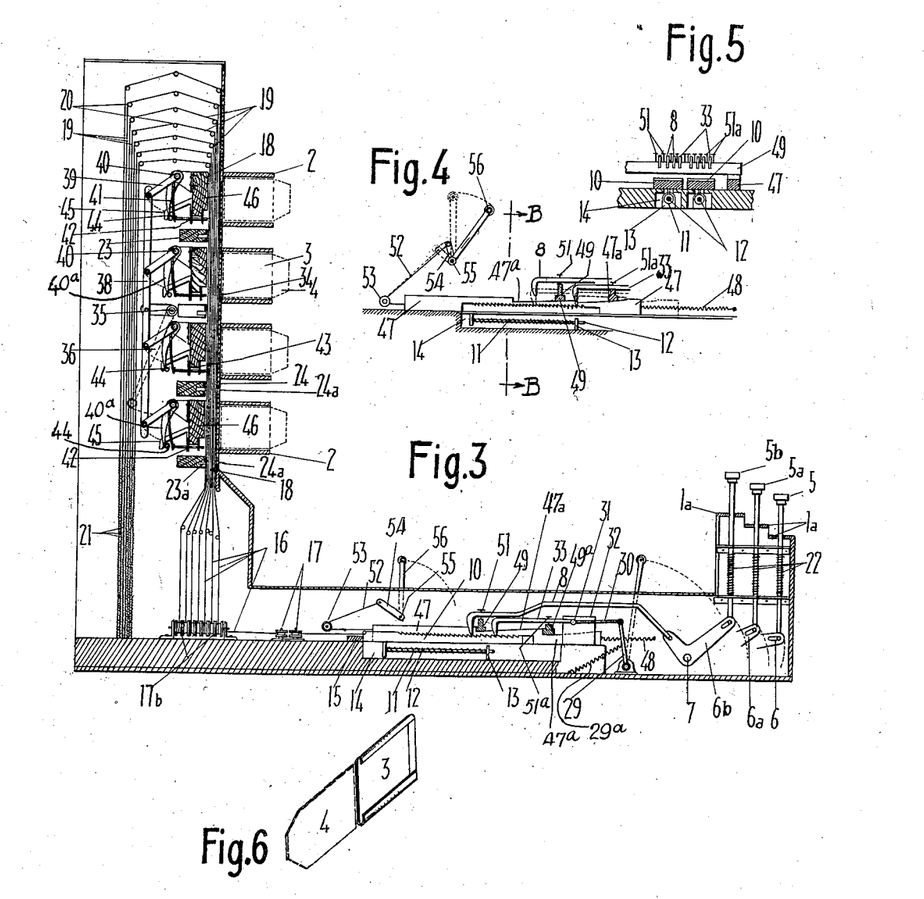
Figure 3 is a longitudinal section through the apparatus, along line A—A of Fig. 7.
Figure 4 is a detail view of the "normalizing" mechanism which restores the apparatus back to its initial or neutral position.
Figure 5 is a partial detail view in cross section along line B—B of Fig. 4.
Figure 6 is a perspective view of a file-card and its corresponding holder.

As behind the card some elements (to be specified hereafter under "Group 4") must act to operate the extraction of the cards and as it would not be well either to mount the matrix or die at this point, both for the reason mentioned and because it would be difficult to make the perforation from the inside of the shelves 2 (wherein, as we know, the cards 4 are contained), all the more when the major part thereof is occupied by the cards, a means has been sought whereby to move the plates 18, with their relative position maintained intact, up to a point where they would be placed on a matrix located in a lower plane than the aforementioned shelves 2, so that it will be an easy job to execute the perforations either by a punch or any other punching apparatus. In Fig. 3 as well as in the diagrams of Figs. 8, 9 and 12, the matrixes 23 will be seen, the same each consisting of a thin plate located behind the plates 18 and between the spaces separating one shelf from the other. Before them, the plates or guides 24 are mounted on the front of the apparatus, while both the matrixes 23 and the said guides 24 are provided with a plurality of holes 23a and 24a which register with one another and are located on the same vertical line as is occupied by the cards 4 of the shelves 2 (see Figs. 8 and 10). Through these holes 23a and 24a, the punch 25 (Fig. 12) is capable of passing, such punch belonging to an accessory apparatus for perforating the plates 18 once they have been moved downwardly for a distance as at 26. For the time being, let it be said that this distance is the one that exists from a point situated behind the cards 4 (where these will be ejected by the selection mechanism which will be explained under "Group 4") downwardly to the center of the holes 23a and 24a.

Let us see now how the plates 18 are caused to move downwardly while maintaining their relative position, that is to say, after having marked with the aid of the keyboard a name the registration of which it is desired to make in the aforementioned plates 18 by means of the said perforations. A device is concerned which is constituted by a shaft 27 (Figs. 3 and 7 and details in Figs. 12 and 13); this shaft passes transversely through the casing 1 of the apparatus and is provided at one of its ends with a crank 28 whereby to give it from the outside a small portion of a revolution. The said shaft 27 is provided with a set of levers 29 normally urged rearwardly by springs 29a, and which by means of the arms 30 link up with a bar 31 parallel to this shaft 27 and arranged on the supports 32 in oblong holes in order that it may be able to move horizontally.

The hooks 33 are, in turn, pivoted to this bar 31, while their free points rest on the racks 10.

We already saw in "Group 2" that upon marking a determined name with the keys the racks 10 travel backwardly and, generally, assume different positions; thus, in Fig. 12 the initial position of the racks 10 is indicated with dotted lines, that is to say, they here abut against the crossbar 15; but the position they occupy after the marking of the name is, for instance, the one shown by the dash and dot lines. Now then, when it becomes necessary to lower the plates 18 in order to perforate them, when registering a name for the first time, this being the job we are at, the crank 28 is operated causing it to describe an arc of a circle (Fig. 12), so that, through the medium of the levers 29, arms 30, bar 31 and rack engaging hooks 33, the racks are made or obliged to effect a forward movement comprising a distance 26b for each of them, which distance will, of course, be equal to the distance 26a which the supports 32 allow the said bar 31 to travel, and these equal or proportional to the distance 26 (Fig. 12) which is the one the plates must travel maintaining their relative position and with respect to the point 34 at which the cards 4 will be ejected. Once the plates 18 have thus been simultaneously lowered, due, as we have seen, to their being connected to the racks 10, their perforation takes place through the hole 24a, with the aid of the punch 25 or another equivalent instrument, the name in question thus being registered in the apparatus. The perforation will be made on just the same vertical line on which the corresponding card will place itself in the shelf 2 (see Figs. 8 and 10). The punch 25 will to this effect meet with the matrix 23 so as to be duly seated in the operation of making the holes I have been referring to. I said before that this device for causing all the racks 10 to travel forwardly at the same time, that is to say, for perforating the plates 18, is used only when a determined name is registered for the first time, these perforations then remaining in the plates for the purpose of selecting the cards corresponding therewith, just as many times as is desired.

In the following I shall describe how to obtain a filed card without needing more work than that of marking on the keys 5, 5a and 5b the name it bears and operating a special lever.

*4th group.—Mechanism for the selection and removal or extraction of a card the name of which had already been registered in the apparatus*

A horizontal shaft 35 (Figs. 1 and 3) is provided which carries on its outside the lever 36 while within it is equipped with the vertical arm 38 pivoted thereto. This arm, in turn, is pivoted to the levers 39 corresponding with the shafts 40 which are transversely arranged in the casing 1 and mounted on suitable bearings. These shafts 40 (being shown in detail in Figs. 9 and 11) are provided with a series of springs 41, of a more or less elliptical shape, the free ends of which are rigidly connected to the needles 42 which are suitably guided in the guides 43.

Upon shafts 40 are swingably mounted pendent arms 40a to which are secured transverse rods 44, the latter being supported by said arms and swingable with the same between each row of springs 41 and the rigid members 45.

Figure 1:
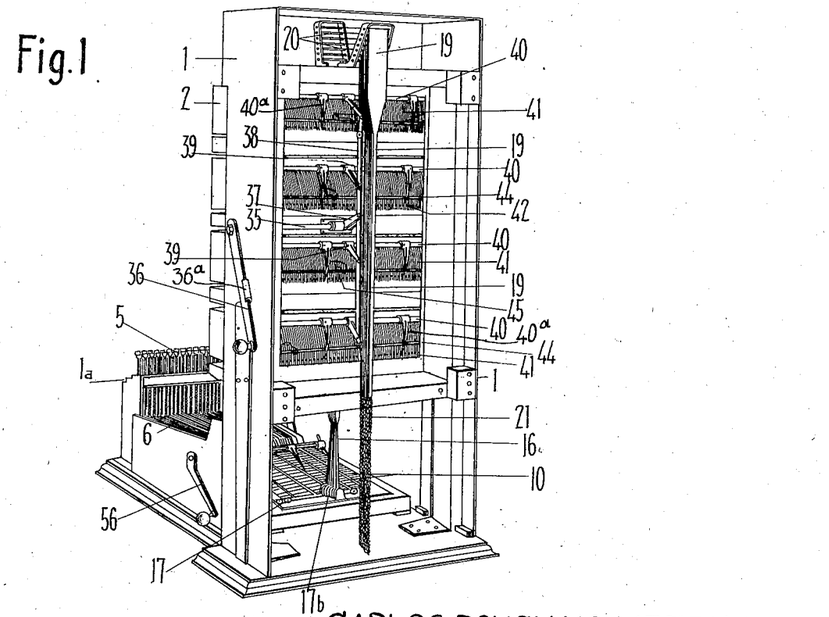
Figure 1 is a general perspective view of the apparatus as seen from a rear angle, and with some covers or lids removed in order to better disclose its internal devices.
Figure 9:
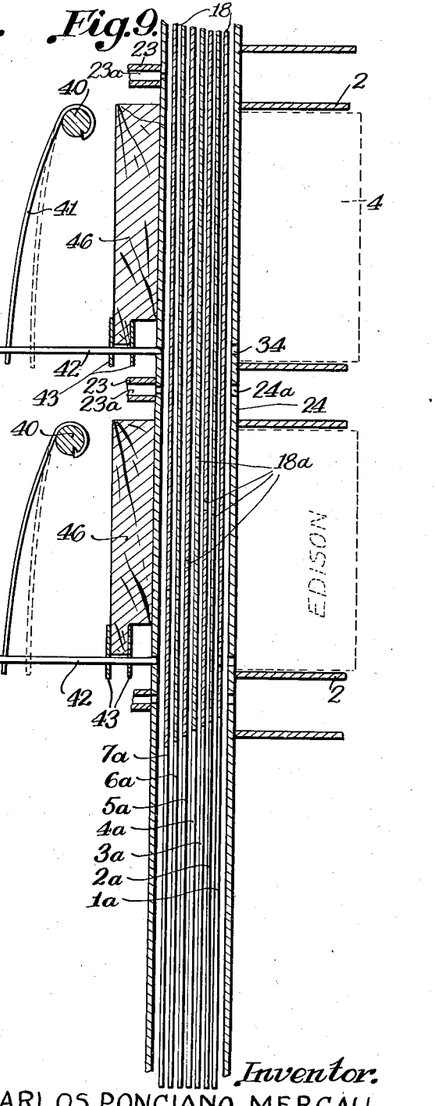
Figure 9 shows the vertical section of the foregoing figure along line C—C.
Figure 10:
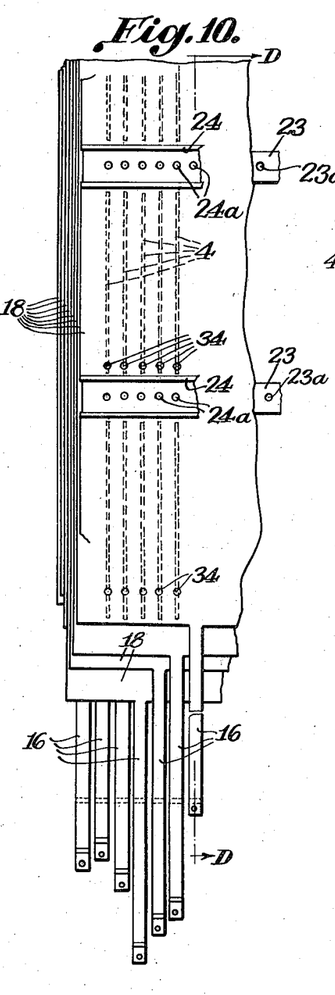
Figure 10 is a repetition of what has been shown in Fig. 8, but this time the plates are shown as moved out of or away from their relative position, the here shown position answering to the selection of a name, i. e., showing the attitude the plates assume when a determined name is being registered or looked for, Figure 11 shows the same as the previous figure, but in a sectional view along line D—D, Figure 12 schematically shows in a side view of how the mechanism works that lowers the plates in order that they may be punched, with the plates maintaining their relative position.
Figure 11:
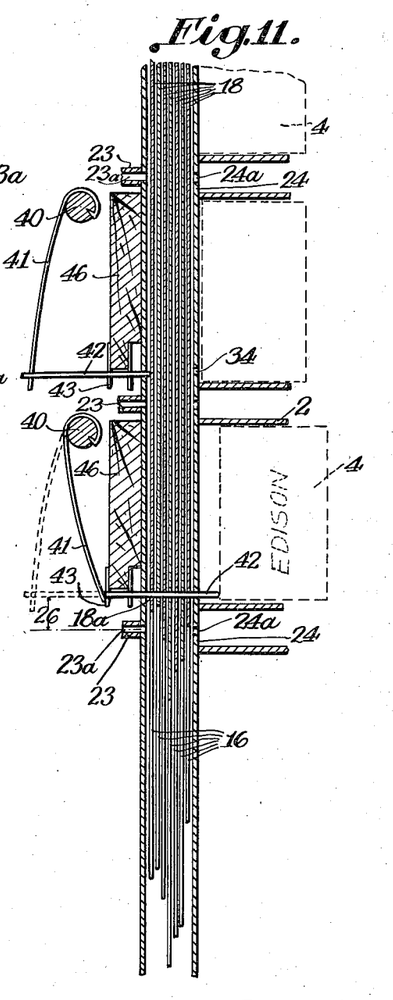

Normally, the shafts 40 retain springs in released position as shown in Fig. 9, while the catch 36a best seen in Fig. 1 serves to prevent the hand lever 36 from swinging too far toward the rear while allowing this lever to be swung forwardly, partly rotating shaft 35, with the result that lever 37 is lowered and by the same in turn member 38 is lowered, and thereby the springs 41 also swung forward in compressed condition by the shaft 40 so as to tend to push pins 42. When the springs 41 are released, they are limited in backward movement by the swingably supported transverse rods 44 which in turn may engage against the inner portions of the lower outer ends of fingers or members 45 which are supported on the cross bars 46, members 45 thus serving as stops for the rods 44, limiting them and also limiting the rearward release movement of springs 41 and bringing them all into line with each other in each row.

The number of the mentioned needles or pins 42 is equal to the amount of holders 3 that it may be possible to lodge within the shelves 2 of the apparatus, and they are directed towards the edge of each one at the rear part, in the same direction where the holes 34 are located.

Figure 8:
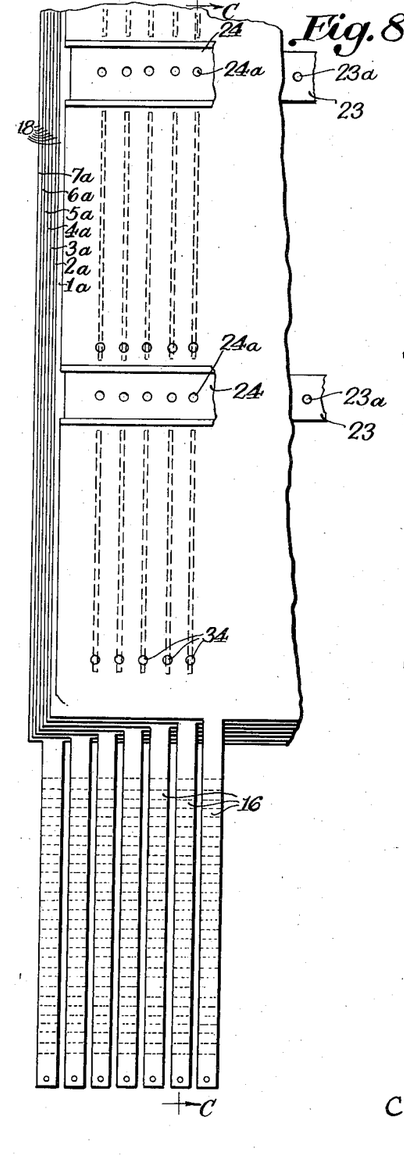
Figure 8 is a partial front view schematically showing the plates in their initial position.

This mechanism works as follows:

We already know that the plates 18, upon being separated from another, due to the inscription of a name by means of the keys 5, 5a and 5b, assume a determined position which is the same as the one that was obtained when the registration of that name took place, as has been explained in the "Groups 2 and 3" of this description. Let it be presumed then that it is desired to extract from the shelf 2 the card answering to that name which is, say, "Edison". The name will be marked on the keyboard, as we already know, following the correlative order of the letters composing it. Then the holes 18a of the plates 18 (Fig. 11) will register just behind the card belonging to the name in question and, upon the lever 36 being operated, it will, on account of its combination, let go the springs 41 the influence of which will be exercised on all the needles 42 of the system which bear on the plates 18. The needle which finds free passage will easily pass through the name "Edison". Should the plates 18 not be in the proper position, viz, that taken when the perforation was made, then the needles would not be able to pass through them, and much more less so when the plates are in their normal attitude (Figs. 8 and 9).

Each name will have its corresponding combination of holes in the plates 18 so that when it is marked on the keyboard the said holes will become automatically lined up so as to permit of the passage of the needle 42 corresponding therewith, in order to cause the card 4 (or its holder 3 in case this is provided) to become somewhat moved away from the shelf 2.

It should be noted that as long as the lever 36 is not operated all the needles 42 will keep some distance clear off the first plate 18 of the unit.

The return operation of the mechanism is completed by the rods 44 which are pendently supported on the mentioned swingable arms 40a and are effective to level the springs 41 in order that they may act uniformly, as well as by the downwardly extending fingers or supports 45 which retain the rods 44 to limit the expansion of the said springs 41 (Figs. 1 and 3). As a rule, the mechanism just described may be made to rest on some wooden cross-bars 46 secured a distance behind the shelves 2.

Winding up, I shall explain how the apparatus is normalized, after it has been utilized, in order to make it fit for a new operation.

5th group.—Normalizing mechanism

This is simply a means of getting the plates 18 back to their original position after they have been moved by means of the keys 5, 5a and 5b in the act of extracting a card, or in registering a name or, also, through a possible error in the registration of names that may have been made on the keyboard of the apparatus. It consists of the slide 47 (Figs. 3, 4, 5 and 7) (one at each side of the apparatus) the upper part of which possesses two oblique planes 47a while its rear end has a tension spring 48 connected to it. On the said inclined planes two cross-bars 49 and 49a act, which are movable in a vertical direction between lateral guideways 50 (Fig. 7). These cross-bars are fitted with a succession of nails respectively 51 and 51a, which guide the pullers 8 and the hooks 33 as described before, so as to prevent them from being displaced laterally.

To the front end of each slide 47 a cable 52 is attached which, after passing over a roller 53, is connected to an arm 54 (Figs. 3, 4 and 7) which is connected to a shaft 55. At one end of this latter, on the outer part, the lever 56 is mounted for imparting a slight rotating movement to the same.

This device operates as follows:

Let it be presumed that the racks 10 are being retained by the pullers 8 as well as by the hooks 33 (as has been described in the Groups 2, 3 and 4), which means that the plates 18 are moved away from their initial position due to the keyboard having been used, and that it is desired to normalize the apparatus with a view to make it fit for a new operation, then, in this case, the lever 56 is operated, whereby the slides 47 are caused to slide through the medium of the shaft 55, arm 54 and the cable 52. In sliding over the inclined planes 47a of the said slides 47, the pullers 8 and the hooks 33 are obliged to ascend by being engaged beneath by bars 49 and 49a (as will be noted from Figs. 4 and 5), freeing the racks 10 which, under the influence of the springs 11 and 21, occupy their initial position as is shown by Figs. 3, 8 and 9. Letting go now the lever 56, both the pullers 8 and the hooks 33 will come down again owing to the spring 48 entering into action, taking the slide 47 back to its previous position. Finally, everything will be restored to the original state, so that the apparatus will be fit for registering a name in order to file a new card and/or for the purpose of extracting the same should it have been registered before, the whole in accordance with the explanation furnished in this description.

The apparatus will work just as well if more keys with signs, numbers or spacers were added to it, or just keys with numbers only in case it were desired that the registering should be operated with the aid of numbers or other signs, instead of letters, which would always correspond with the cards filed in the machine.

It is evident that it may be possible for certain constructional and detail modifications to be introduced in the various mechanisms without thereby departing from the scope of the nature of this invention which is clearly ascertained in the appended claiming clauses.

What I claim is:

1. In apparatus for selecting, classifying, filing and delivering such objects as cards, records, folders, books and the like, having a plurality of individually movable plates arranged in a practically coextensive series, said plates being differently perforated to correspond individually with each object stored, means including a plurality of movable racks and a plurality of cooperative rack engaging hook members for moving said plates according to the particular object to be selected, filed or delivered, so that predetermined perforations in all of said plates corresponding to said particular object are aligned to form a clear and unobstructed path, there being return springs connected to said racks and means including individual pins adapted to enter said aligned perforations to cause said particular object to be positioned apart from the remaining objects contained by the apparatus, a movable lever connected with an arm which it is adapted to operate, a slidable member movable in parallelism with said racks and operatively connected to said arm and having at least one inclined portion upon the same, there being also a return spring connected to said slidable member, and a transverse member lying upon said inclined portion of the slidable member and extending beneath said hook members for the purpose of raising the latter and disengaging the same from the racks upon operation of said lever and consequent shifting of said slidable member and its inclined portion beneath said transverse member.

2. In apparatus for selecting, classifying, filing and delivering such objects as cards, records, folders, books and the like, having a plurality of individually movable plates arranged in a practically coextensive series, there being means for containing the mentioned objects in vertically superposed tiers in the apparatus and manually operated means for perforating said plates in predetermined selective manner in intermediate positions between said tiers to correspond with different indicia identifying the various objects to be registered and filed in the apparatus, means for shifting all the plates simultaneously from previously attained selective relative positions for perforating the same comprising a slidable member connected to a return spring, there being also a plurality of racks connected individually to said plates and key operated hook members for moving said racks and plates at will to the attained selective relative positions, manual means for temporarily shifting said slidable member a predetermined distance and means operated by said slidable member so as to simultaneously shift all of the racks and the plates said predetermined distance.

3. In apparatus for selecting, classifying, filing and delivering such objects as cards, records, folders, books and the like, having a plurality of individually movable plates arranged in a practically coextensive series, said plates being perforated in predetermined positions to correspond in different predetermined relative positions to the various individual objects to be filed or ejected and in each of which positions a clear path is formed through the perforations in all of said plates corresponding to the object predetermined for the same, there being manually operated means for moving said plates in predetermined manner to positions corresponding to any particular object to be filed or delivered and selective mechanical operating members communicating between said manually operated means and said plates including movable toothed members connected to said plates, hooked members engaging the teeth upon said toothed members and operated by said manually operable means so as to move said toothed members directly in accordance with the operation of said manually operable means, there being also a plurality of pins individually disposed in line with the objects to be filed and delivered, means for shifting said pins, comprising a shaft carrying a plurality of springs bearing against said pins, manual means including a handle for causing partial rotation of said shaft, and means for lining up all of said springs in uniform manner, each of said pins being capable of passing through said plates toward the object corresponding thereto when the plates occupy predetermined relative positions in which a clear path through the perforations in said plates corresponds to and registers with the pin involved.

4. In apparatus for selecting, classifying, filing and delivering such objects as cards, records, folders, books and the like, having a plurality of individually movable plates arranged in a practically coextensive series, there being means for containing the mentioned objects in the apparatus in the form of shelves including object holders for containing one or more cards each supported on a shelf, there being also a plurality of depressible keys provided with hook means for moving said plates in predetermined manner according to the key depressed and means for returning all of said plates to initial position, as well as means for cooperating with said plates as a group when moved by said keys in order to move one of said object holders and thereby position the one or more cards therein apart from the remaining object holders and contained cards, a slide member having inclined portions upon the same and connected to a return spring, means in contact with one of said inclined portions of the slide member and with said hook means to dissociate the latter from the plates, and manually operated means for shifting the plates as a group a predetermined amount for punching the same, there being means for punching through said plates at will, said last manually operated means for shifting the plates as a group being caused to release the plates by contact with one of the inclined portions of said slide member so as to release said plates.

CARLOS PONCIANO MERCAU.